United States Patent [19]
Moore et al.

[11] Patent Number: 6,011,916
[45] Date of Patent: Jan. 4, 2000

[54] JAVA I/O TOOLKIT FOR APPLICATIONS AND APPLETS

[75] Inventors: Victor S. Moore, Boynton Beach; Glen R. Walters, Sebring, both of Fla.

[73] Assignee: International Business Machines Corp., Armonk, N.Y.

[21] Appl. No.: 09/076,391

[22] Filed: May 12, 1998

[51] Int. Cl.[7] ................................................ G06F 9/45
[52] U.S. Cl. .................................................... 395/701
[58] Field of Search ..................................... 395/712, 701

[56] References Cited

U.S. PATENT DOCUMENTS

| | | | |
|---|---|---|---|
| 5,828,840 | 10/1998 | Cowan et al. | 395/200.33 |
| 5,842,020 | 11/1998 | Faustini | 395/701 |
| 5,892,966 | 4/1999 | Petrick et al. | 395/800.36 |
| 5,899,990 | 5/1999 | Maritzen et al. | 707/4 |

*Primary Examiner*—Tariq R. Hafiz
*Assistant Examiner*—Wei Zhen
*Attorney, Agent, or Firm*—Gunster, Yoakley, Valdes-Fauli & Stewart; Jon A. Gibbons

[57] ABSTRACT

A method to perform I/O (Input/Output) operations in a data processing unit running an interpretative based program in an Interpretive Machine (IM). One example on an interpretative based program running in an IM is a Java based program. An I/O class for passing data into the interpretative based program and out of a the interpretative based program is defined. An object representing an instance of this I/O class is created. The I/O class includes a first member function called an Applet function for handling I/O operations when the IM is running as an Applet coupled to a Web browser. The Applet function has its own procedures and data variables for performing I/O operations. The I/O class includes a second member function called and Application function for handling I/O operations when the IM is running as an Application not coupled to a Web browser. The Application function has its own procedures and variables for performing I/O operations. A check is made to determine whether the interpretative based program is being executed with or without a browser. When the interpretative based program is being executed with a browser, the Applet function performs I/O operations and when the interpretive based program is being executed without a browser, the Application function performs the I/O operations. In accordance with another embodiment of the present invention, a computer readable medium is disclosed corresponding to the above method.

17 Claims, 6 Drawing Sheets

JAVA I/O TOOLKIT FOR APPLICATIONS AND APPLETS

CROSS-REFERENCE TO RELATED APPLICATIONS

Not applicable

BACKGROUND OF THE INVENTION

1. Field of the Invention

The invention disclosed broadly relates to the field of computer software development and more particularly relates to the field of software toolkits for application development for Java Applications and Java Applets. The invention provides software developers with a consistent Input/Output (I/O) function interface for both Java Applications and Java Applets. This eliminates the problem of developing program logic to execute both as a Java Application and as a Java Applet.

2. Description of the Related Art

Java is a programming language developed by Sun Microsystems. The basic idea behind Java programming is that the same Java software code can run on many different kinds of computers. Stated differently, the goal of Java is to write software once to be run on any Java compliant platform. These different platforms include both different hardware platforms, e.g., RISC, PC, Macintosh, Sparc and different operating system platforms, e.g., Windows 95/NT, Unix, AIX, Copeland. These platforms cover a large class of completely different machines from large servers to thin clients to small portable consumer devices such as personal digital assistants. Software programming tools are available from a variety of suppliers including Sun Microsystems (refer to online URL www.sun.com/java) for developing Java-based software applications or more simply called Java Applications. Software tools for performing I/O (Input/Output) operations for Java Applications are called the Java I/O Toolkit. This Java I/O Toolkit provides software developers with a library of object oriented functions for reading and writing to files that are local to the hardware platform in which the Java Application is executing. Other Java I/O Toolkit functions include performing other I/O function across a network. One example is the reading and writing of files to remote servers.

During the development of Java, the Internet and more particular the World Wide Web ("Web") has become immensely popular largely because of the ease of finding information and the user-friendliness of today's browsers. A feature known as hypertext allows a user to access information from one Web page to another Web page by simply pointing (using a pointing device such as a mouse) at the hypertext and clicking. Another feature that makes the Web attractive is having the ability to process the information (or content) in remote Web pages without the requirement of having a specialized application program for each kind of content accessed. Thus, the same content is viewed across different platforms. Browser technology has evolved to enable running of applications that manipulate this content across a wide variety of different platforms.

In 1995, Sun Microsystems formally introduced HotJava. HotJava is a Web browser that can run Java code. Other Web browsers such as Netscape Navigator and Microsoft Internet Explorer have since added Java capability to their base Web browser products. The combination of Web browser technology combined with Java technology has increased the fundamental of appeal of Java, i.e., the ability to write an application once and run the application across a variety of platforms including Web browsers. And while most of the Java code is portable across platforms including Java compliant Web browsers, some functions such as returning handles to frames or the handling of Input/Output (I/O) are not compatible. Two categories of Java-based programs are necessary. The first category of Java base programs is called a Java Application that runs across computer platforms without being combined with a Web browser. The second category of Java-based programs is called Java Applets that run across systems using Java compliant Web browsers. The reason many functions are not compatible across Java runtime environments of Applets and Applications is due to security concerns. Java Applets are typically loaded by a Web browser being accessed. The Applet by design cannot write or read to local storage devices. This deliberate limitation for I/O is designed to minimize the destructive use of Java Applets as computer viruses that unknowingly make changes to the compute system of the end user. A Java Applet with local write and read access then could easily create havoc by deleting, renaming, scrambling and other wise corrupting a user computer system.

Both of these categories of Java-based programs, Java Application and Java Applets require specialized I/O handling. This specialized I/O is handled by the use of two different Java Classes in the Java I/O toolkit, one class for Java Applets and one class for Java Applications. Because of the requirement of two classes, a developer wishing to create a Java-based software application must treat each run time environment, i.e., Java Applets and Java Applications differently. Because of these different Java I/O toolkit requirements a software developer is forced to develop separate codes to handle each of these two Java I/O classes. Accordingly, there is a need for a method to provide an I/O class interface that can be used both by Java Applications and Java Applets which overcomes the above problems.

Another problem in developing Java-based software applications is the ability to retrieve images. The problem of developing Java-based code specifically for the Java runtime environment as a Java Application or Java Applet for handling images is similar to the problem described above for handling I/O functions. A Java development must create two different sets of code to handle the particular logic and functions for a Java Applet and a Java Application in two separate ways. The requirement of including logic to handle image functions in two distinct ways can produce complex, hard to read and difficult to debug software code. Therefore, a need exists to provide a method to write Java applications that retrieve images when running as both Java Applets and Java Application modes.

SUMMARY OF THE INVENTION

Briefly, in accordance with the present invention, disclosed is a method to perform I/O (Input/Output) operations for an interpretative based program executing on an Interpretative Machine (IM) in a data processing unit. The method comprising the steps of: defining an I/O class for passing data into the program and for passing data out of the program; creating an object with a first class method based on the I/O class for the interpretative based program for execution on an IM not coupled to a Web browser and a second class method based on the I/O class for execution on an IM coupled to a Web browser; wherein the object is an instance of the I/O class with the I/O class having its own procedures and data variables for performing I/O operations; checking to determine whether the interpretative based program is being executed on an IM not coupled to a Web browser or on an IM coupled to a Web browser; if said interpretative based program is executing on an IM not coupled to a Web browser executing said first class method; wherein said first class method perform I/O operations during execution of said interpretative based program; and if said interpretative based program is executing on an IM coupled to a Web browser executing said second class method; wherein either said second class method perform I/O operations during execution of said interpretative based program.

DETAILED DESCRIPTION OF AN EMBODIMENT

Figure 1:
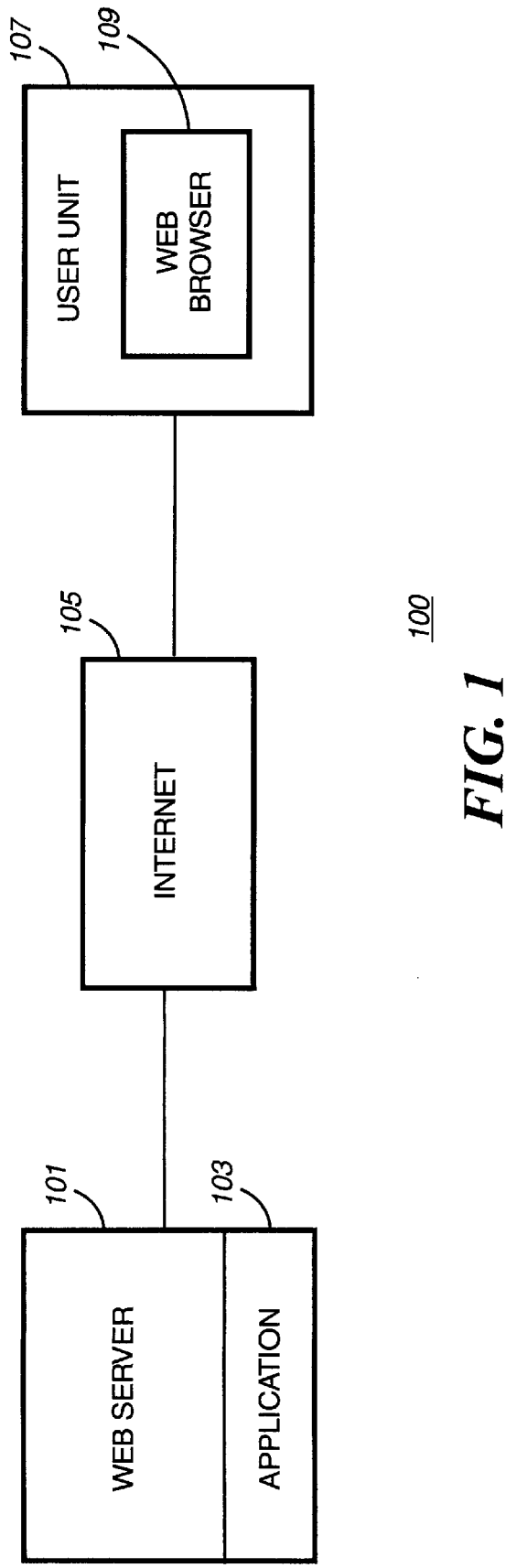
FIG. 1 is a functional block diagram of a typical data processing system for hosting Web pages in which the present invention is implemented.

FIG. 1 depicts a functional block diagram of a typical data processing system for hosting Web pages 100. A Web server 101 running a Web server and application 103. The Web server 101 is connected to the Internet 105. End-user data processing unit 107 with Web browser 109 are connected to the Internet 107. Web server 101 is an IBM PC Server, Sun Sparc Server, HP RISC server or equivalent. The Web browser 109 is any HTTP (Hyper-Text-Transfer-Protocol) compatible product such as Netscape Navigator, Sun Hot-Java Browser, Microsoft Internet Explorer or equivalent.

The application 103 is a Web page server application for hosting Web pages on the Web browser 109. The application 103 is written in any software language that can transmit Sun Microsystems Java-based applications to Web browser 109. It is important to point out that the precise operating systems and hardware configurations of the Web server 101, the end-user unit 107 and the Web-browser 109 are not limited to any specific hardware or software configuration. These systems can be implemented on a wide variety of hardware and software platforms.

Figure 2:
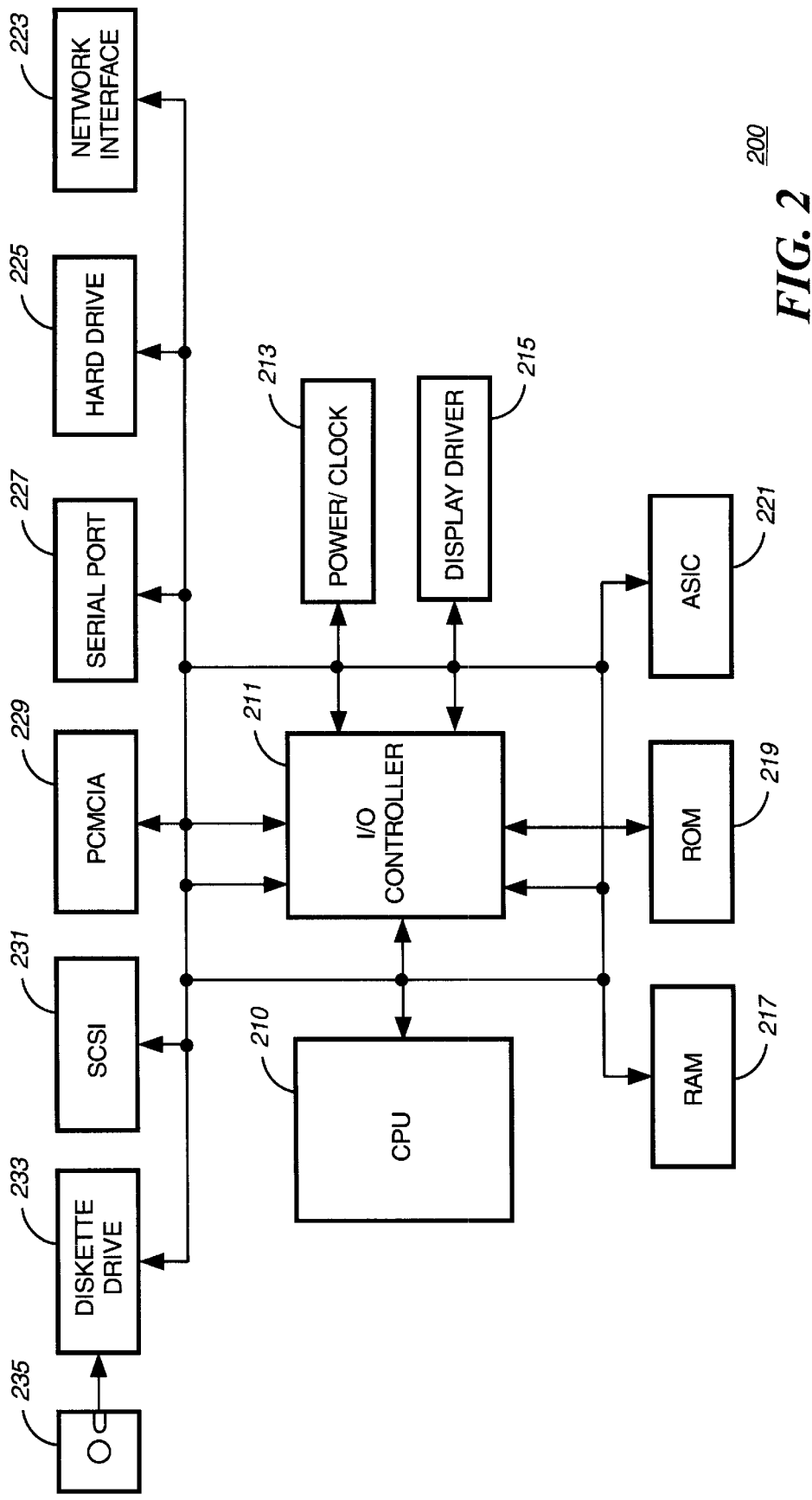
FIG. 2 is a functional block diagram of the major electrical components of a computer system 200 used in accordance with this invention.

Referring to FIG. 2, there is shown a block diagram of the major electrical components of a computer system 200 used in accordance with this invention. Computer system 200 is representative hardware of end-user unit 107 hosting Web browser 109 for Java Applets. In the Java Application mode, computer system 200 can be a standalone system. The electrical components of computer system 200 include: a central processing unit (CPU) 210, an Input/Output (I/O) Controller 211, a system power and clock source 213; a display driver 215; RAM 217; ROM 219; ASIC (application specific integrated circuit) 221 and a hard disk drive 225. These are representative components of a computer. The operation of a computer comprising these elements is well understood. Network interface 223 provides connection to a computer network such as Ethernet, TCP/IP or other popular protocol network interfaces. Optional components for interfacing to external peripherals include: a Small Computer Systems Interface (SCSI) port 231 for attaching peripherals; a PCMCIA slot 229; and serial port 227. An optional diskette drive 233 is shown for loading or saving code to removable diskettes 235. The system 200 may be implemented by combination of hardware and software. Moreover, the functionality required for using the invention may be embodied in computer-readable media (such as 3.5 inch diskette 235) to be used in programming an information-processing apparatus (e.g., a personal computer) to perform in accordance with the invention.

Figure 3:
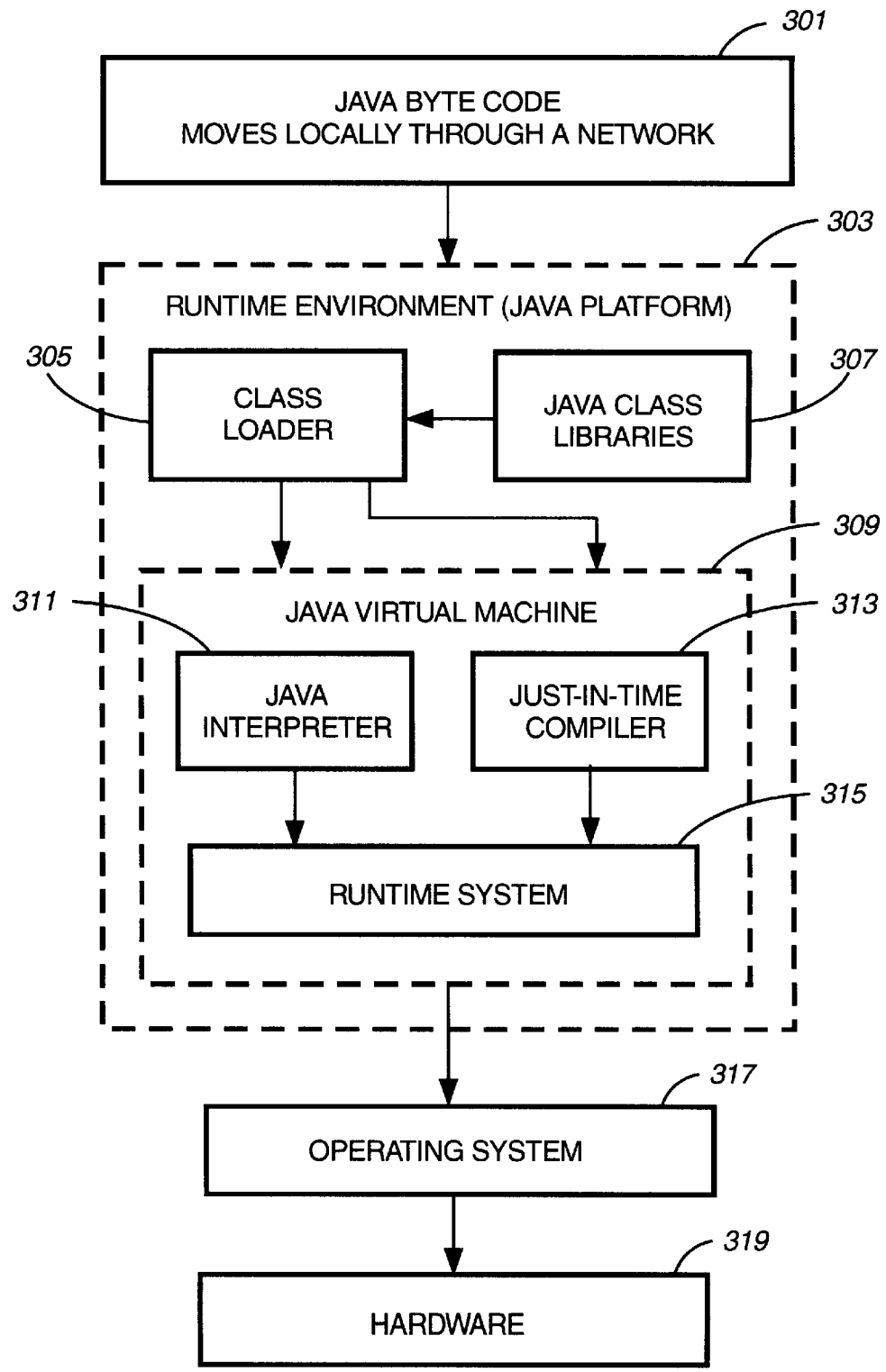
FIG. 3 is a block diagram of the major electrical components of a data processing system for hosting Web pages according to FIG. 1.

Referring now to FIG. 3 is a block diagram of Java Runtime environment 300 according to the present invention. The Java language was created by Sun Microsystems. More information on Java Software and Java Developers tools is available online URL www.sun.com/java. The use of Java and the creation of Java Applications and Java Applets is well known. Once a software developer writes a Java source code, the code, rather than being compiled into a format designed for a specific platform, Java developers compile Java source into an intermediate form of byte code that can be executed on any system with a runtime environment. Java byte code 301 moves from a local hard disk over a network to a Java runtime environment 303. The Java byte code 301 is an intermediate form of byte code, that unlike platform specific byte code, can be executed on any platform with a Java runtime environment. The Java runtime environment 303 is the platform that enables Java Applications or in the case of Web browsers Java Applets, to run on any system regardless of the operating system and the underlying hardware. When the Java byte code 301 arrives in the runtime environment for a particular computer platform, a class loader 305 retrieves one or more Java class libraries 307 for the given operations specified by the Java byte code 301. The Java byte code 301 and Java class libraries are dynamically loaded in the Java Virtual Machine (VM) 309. The Java VM 309 is the heart of the Java platform. It is the Java VM that is customized to work with a particular operating system 319 such as Unix or Windows NT and with a particular hardware platform 319 such as HP RISC or Intel Pentium class machines. A Just-In-Time compiler 313 for dynamic compiling Java Interpreter 311 and runtime system 315 are known components of the Java VM 309. The Java VM 309 permits portability across a wide variety of hardware 319, such as computer system 200, and permits portability across a wide variety of software 317 platforms.

The Java runtime system 315 interprets the Java byte code 301 and Java class libraries 307 to run the Java program. If the Java VM is coupled to a Web browser, the Java program is called a Java Applet. Alternately, if the Java VM is not coupled to a Web browser, the Java program is called a Java Application.

Many programming terms, specifically object oriented programming terms are used throughout this specification and in the attached claims. A short list of object oriented terms used in Java are as follows:

Class a description of an object. For example, there might be a class called shape that contains objects which are circles, rectangles, and triangles. The class defines all the common properties of the different objects that belong to it. Note: In the example above, each object such as a rectangle may itself be a class (an object is an instance of a class) with common properties that belong to the specific class. For rectangles this these are the length and the width of the rectangle.

Interpretative Machine: a runtime environment for interpretive type programming languages including Basic and Java for executing source code without the need of intermediate steps such as compiling or linking. In the case of Java this is the Java Virtual Machine (VM). In Basic this is the Basic interpreter.

Input: data flow into a program.

Object: an object is a self-contained entity that consists of both data and procedures to manipulate the data. An object is an instance of a class.

Output: data flow out of a program.

Method: a member function in a class.

Procedures: a sequence of programming instructions that may be used in one or more points in a program. Procedures usually have one or more input parameters and can produce one or more output parameters. Procedures are also referred to as functions or routines.

Stream: an abstraction that refers to the flow of data into and out of an application or program. A stream output refers to the process of writing data to a file, to a printer, to a display, to a network, or to any device coupled to a computer for receiving data. An input stream refers to the process of reading data from a file, from a keyboard entry, from a mouse, from a network or from any other device coupled to a computer.

In the preferred embodiment each function described for the Java I/O toolkit is a member of the Java class libraries 307. Each function invoked through a call in the Java byte code 301 is dynamically loaded.

Figure 4:
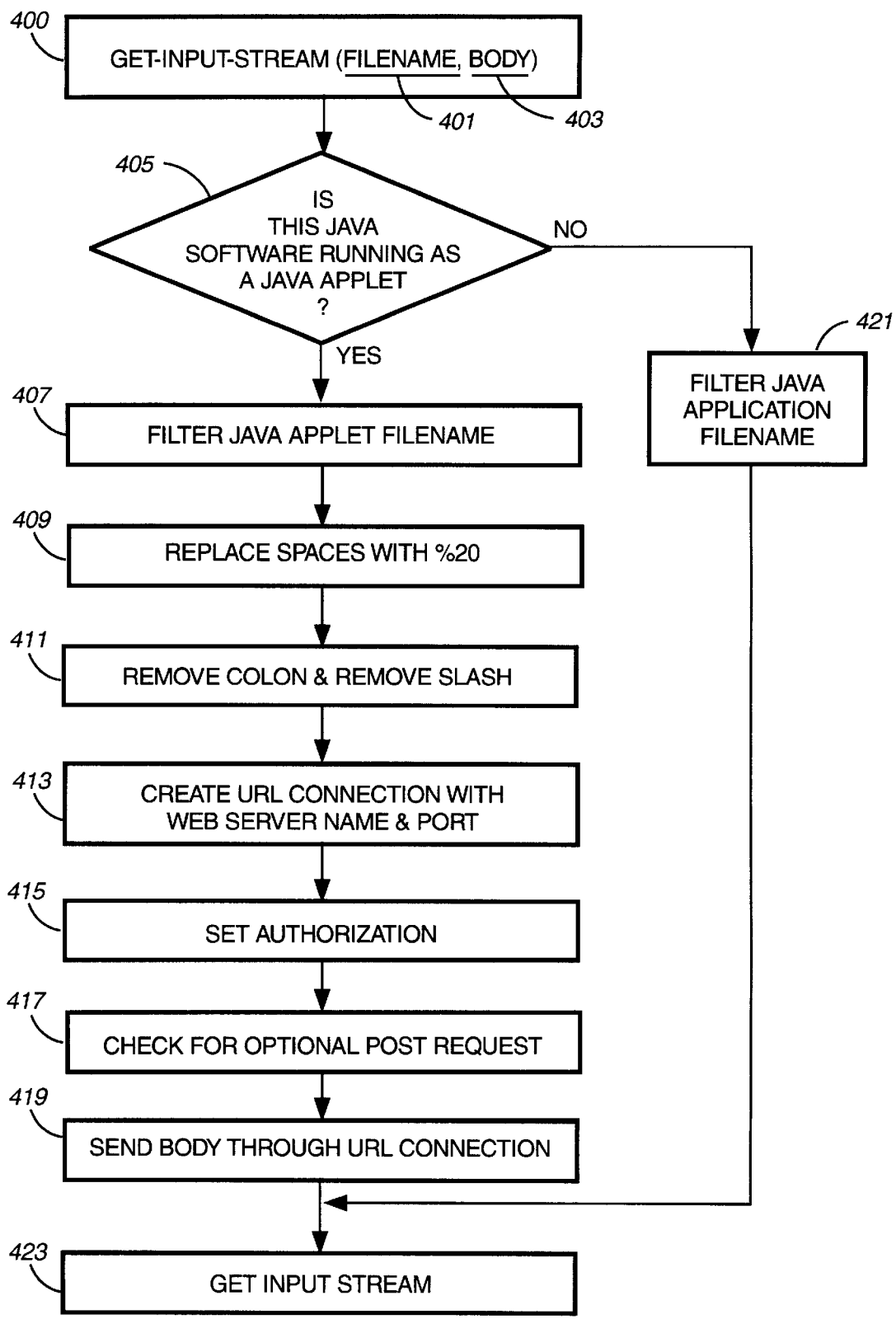
FIG. 4 is a flow chart of the Java I/O Toolkit function for an input stream according to the present invention.

Referring now to FIG. 4, shown is a flow chart of the Java I/O Toolkit function for a get-input-stream Java function 400 according to the present invention. The get-input-stream function 400 contains two parameters a filename 401 and body 403 to send with HTTP request if the Java byte code 301 is running as a Java Applet. To assist in describing this process flow, an example filename 401 with directory path c:\%lib%\test file.txt will be used. The get-input-stream function begins with determining if the Java byte code 301 is executing as a Java Applet or Java Application, step 405. The process of determining if a Java application is running as a Java Applet or Java Application is known. Java Applet filename 401 is filtered in step 407. During filtering the filename 401 is checked to convert any private macros such as %lib% or %industry% to correspond to the directories for Web server 101. In addition the first letter of the filename is dropped. As an example assume the %lib% path is public_dir, the resulting filename 401 is now /public_dir/test file.txt. Notice that the slashes are converted to forward "/" slashes unlike in Microsoft Windows where the slashes are backward "\". The reason is the difference a Java-based application is handled in Java Application mode as compared with Java Applet mode. When a Java-based application is executing in the Java Application mode file class methods will work with forward slashes, even in Windows 95/NT. On the other hand when a Java-based application is executing as a Java Applet, the class methods do not accept backward slashes.

Step 409 converts any spaces in a filename 401 to %20. The %20 is the ASCII representation for the space character. The conversion of spaces in a filename 401 to the ASCII space character ensures the transfer of the filename 401 over a variety of types of networks and that space characters will not be accidentally omitted or corrupted. The process of replacing target characters in a string with set replacement characters is known and can be accomplished in many different ways inside a Java program. One method is to determine the length of the string and to use a for-loop to step through the character string replacing characters until the length of the string has been traversed.

The Web server 101 runs a CGI (common gateway interface), which is a standard for interfacing external applications with information servers, such as Web servers or HTTP (hyper-text-transfer-protocol) servers. Automatically the %20 character is replaced back with a space character at the Web sever 101. This process of using %20 characters in filenames for accessing Web servers is known. The colon character and backslash character are removed, step 411. The resulting filename 401 is public_dir/test%20file.txt. A URL connection is created with a Web server name and port address, step 413. The Web server name is usually the server Applet was loaded from, e.g., www.generic.com and the port address is typically 80 for TCP/IP connections. Other web server names and port addresses can be specified. Optional authorization, step 415 is set with a userid and password. The type of request is next tested, step 417. If the get-input-stream 400 is a Java Applet post query, the body of the request is sent out to URL connection, step 419. The input stream accessed by the URL connection 413, filename 401, optional post request 419 is then returned, step 423.

Returning to step 413, if the Java-based software application is a Java Application, a filter for the Java Application is performed, step 423. The filtering performed in the Java Application mode is replacing relative subdirectories with the absolute file path. For example a file name might not have an absolute path. In this case, the absolute path is constructed at runtime, which will be difference depending on the installation directory of the Java Application. The input stream referenced by the file name and full file path is retrieve.

Figure 5:
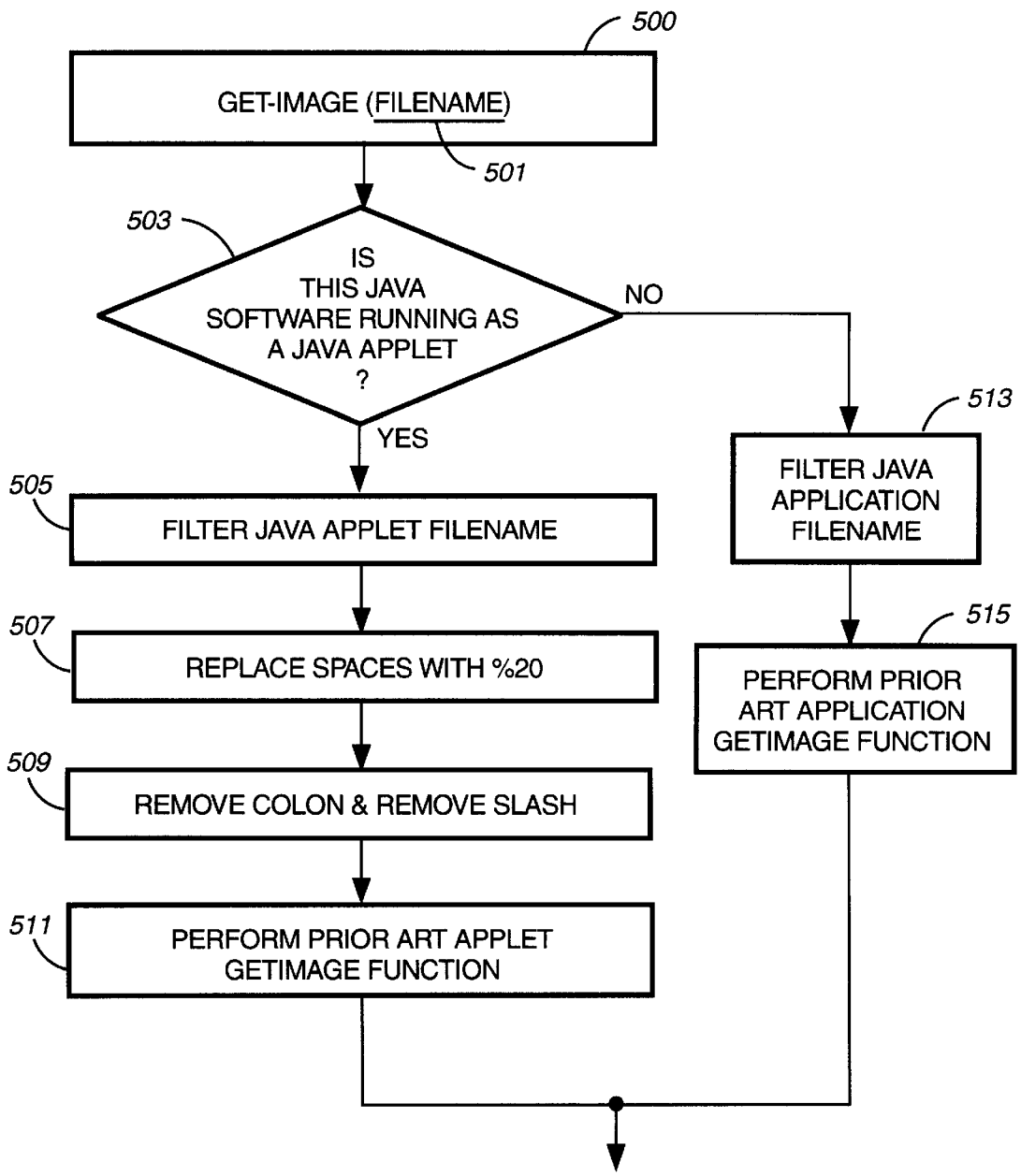
FIG. 5 is a flow chart of the Java I/O Toolkit function for an alternate embodiment of FIG. 4 for retrieving image files.

Referring to FIG. 5 is a flow chart of the Java I/O Toolkit function for an alternate embodiment of FIG. 4 for retrieving image files, get-image file 500. The initial process flow is identical as described for FIG. 4, however only one parameter, a filename 501 is used. As described above in initial process steps 405, 407, 409, 411 and 421, a determination of which runtime environment is made in step 505. The filename 501 is filtered in step 503, space characters replaced in step 507, and colon and slash characters removed step 509. Instead of creating a generic URL connection, a prior art class library function call for a Java Applet is performed, step 511. This function call is a get-image function call and is made available through the Sun Microsystems development tools for Java Applets. If the Java-based application is running in a Java Application mode, a filtering step 513 is preformed identical to the filter step as described in step 421 above. Next the process continues step 515, instead of performing a generic get input stream call, a prior art class library function call for a Java Applications is performed. This function call is a get-image function call and is made available through the Sun Microsystems development tools for Java Applets.

Figure 6:
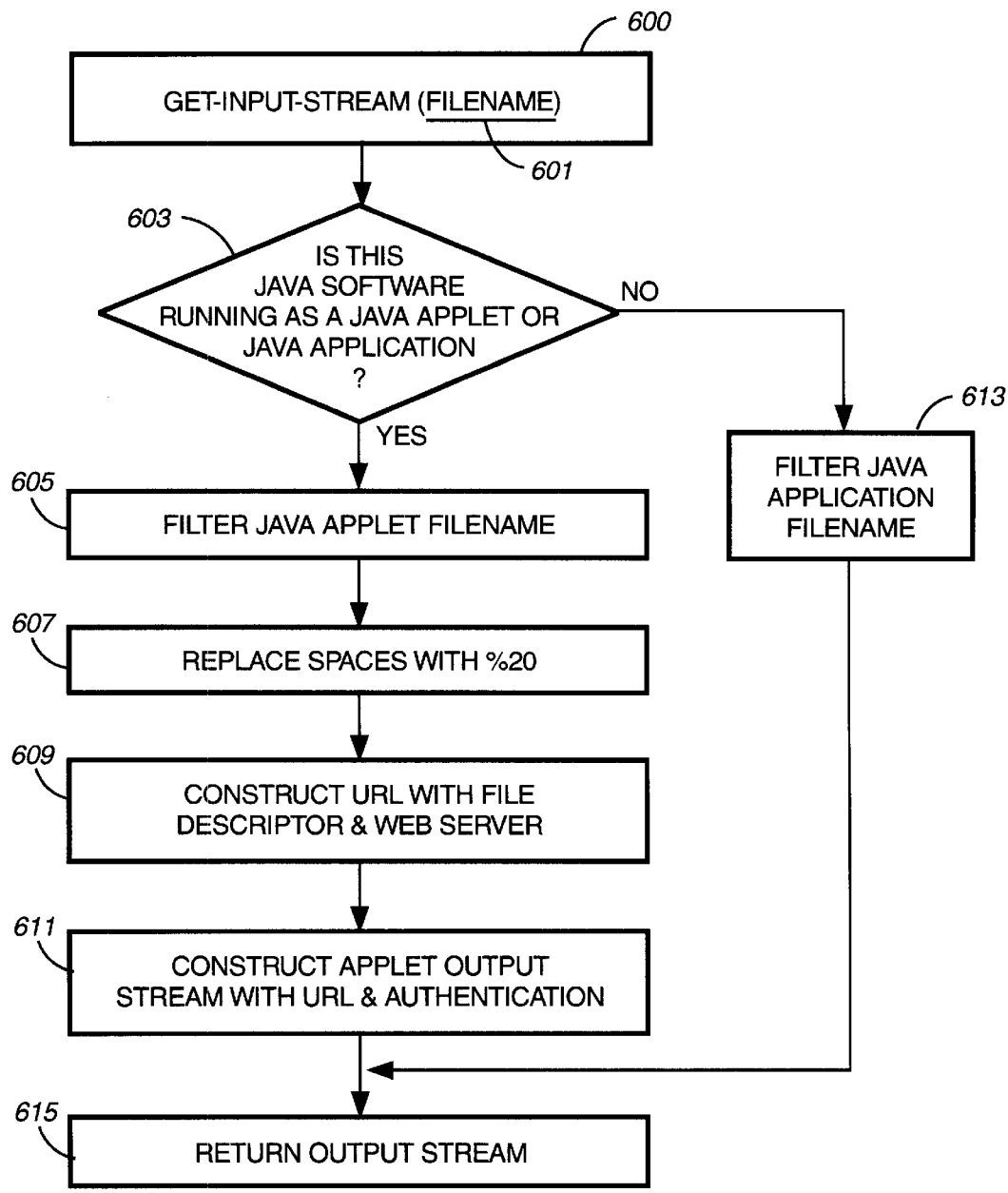
FIG. 6 is a flow chart of the Java I/O Toolkit function for an output stream according to the present invention.

Referring to FIG. 6, shown is a flow chart of the Java I/O Toolkit function for get-output-stream Java function 600 according to the present invention. The get-output-stream Java function 600 has one parameter, the filename 601. As in FIG. 4 described above, the example filename 601 is c:\%lib%\test file.txt. The get-output-stream function begins with the analogous steps 603, 605, 607, and 613 as describer in the process flow of FIG. 4, steps 405, 407, 409 and 421. A determination is made if the Java byte code 301 is executing as a Java Applet or Java Application, step 603. If the Java byte code 301 is executing as a Java Applet, the filename 601 is check to convert any private macros such as %lib% or %industry% to correspond to the directories for Web server 101. In addition the first letter of the filename is dropped and the back slashes converted to forward slashed. As above in FIG. 4, assume the %lib% path is public_dir, the resulting filename is now :/public_dir/test file.txt. Next, as described above, all spaces are converted to %20 producing /public_dir/test%20file.txt.

In step 609, a URL is constructed with a filename and Web server name from which the Java Applet was initially loaded. An output stream with the URL constructed in step 611 is open, step 613. An optional authentication process is included in step 611 if the file requires userid and password protection. The output stream 615 is returned.

In an alternate embodiment the Java I/O toolkit of the present invention is extended to include other functions related to base stream input and stream output functions. A table with each function name, the Java Application mode behavior and the Java Applet mode is as follows:

| Function | Application Mode | Applet Mode |
|---|---|---|
| Reading a file | Opens the file directly, using FileInputStream from prior art Java I/O Toolkit. | Opens the file on the web server, using URLConnection. Also uses the current authorization setting for protected documents. |
| Writing a file | Opens the file directly using, FileOutputStream from prior art Java I/O Toolkit. | Creates the file on the web server using a servlet and current authorization setting. |
| Getting a list | Gets the list directly using the list() method of the File class. | Gets the list using a servlet and current authorization setting. |
| Referring to files | Replaces %lib% token with path to library on local file system, replaces %industry% with directory for current industry. Generates filenames for user's files (in the "out" directory). | Replaces %lib% token with path to library on web server replaces %industry% with directory for current industry. Generates filenames for user's files (in the user's directory, e.g. ~walters). |
| Getting images | Gets images using the get-image(String) method of the Toolkit class. | Gets images using the get-image(URL,String) method of the Applet class |
| Deleting files | Deletes the file directly, using the delete() method of the File class | Deletes the file using a servlet and current authorization setting. |

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A method to perform I/O (Input/Output) operations in a data processing unit comprising the steps of:

executing an interpretative based program on an Interpretative Machine (IM);

defining an I/O class for passing data into said program and for passing data out of said program;

creating an object with a first class method based on said I/O class for said interpretative based program for execution on an IM not coupled to a Web browser and a second class method based on said I/O class for execution on an IM coupled to a Web browser; wherein said object is an instance of said I/O class with said I/O class having its own procedures and data variables for performing I/O operations;

checking to determine whether said interpretative based program is being executed on an IM not coupled to a Web browser or on an IM coupled to a Web browser;

if said interpretative based program is executing on an IM not coupled to a Web browser executing said first class method; wherein said first class method perform I/O operations during execution of said interpretative based program; and if said interpretative based program is executing on an IM coupled to a Web browser executing said second class method; wherein either said second class method perform I/O operations during execution of said interpretative based program.

2. The method to perform I/O operations of claim 1, wherein said step of executing an interpretative based program includes a Java based program and executing said Java based program.

3. The method to perform I/O operations of claim 1, wherein said if step of executing on an IM not coupled to a Web browser includes executing a interpretative based program running on an IM not coupled to a Web Browser is a JAVA Application.

4. The method to perform I/O operations of claim 1, wherein said if step of executing on an IM coupled to a Web browser includes executing a interpretative based program running on an IM not coupled to a Web Browser is a JAVA Applet.

5. The method to perform I/O operations of claim 1, wherein said step of executing an interpretative based program includes an IM running a Java Virtual Machine.

6. The method to perform I/O operations of claim 1, further comprises:

defining an I/O class for passing data into said data processing unit and for passing data out of said data processing unit; wherein at least part of said passing of data is through use of a file name.

7. The method to perform I/O operations of claim 1, further comprising:

defining an I/O class for passing data into said data processing unit and for passing data out of said data processing unit; wherein at least part of said passing of data is through use of a URL (Uniform Resource Locator).

8. The method to perform I/O operations of claim 1, further comprising:

defining an I/O class for passing data into said data processing unit and for passing data out of said data processing unit; wherein said I/O class includes authorization function with a userid and password; and authenticating said at least some of said I/O operations with said userid and said password.

9. The method to perform I/O operations of claim 7, further comprising:

appending a username to said URL.

10. A computer readable storage medium containing program instructions for performing I/O (Input/Output) operations in a data processing unit, said program instructions comprising instructions for:

executing an interpretative based program on an Interpretative Machine (IM);

defining an I/O class for passing data into said program and for passing data out of said program;

creating an object with a first class method based on said I/O class for said interpretative based program for execution on an IM not coupled to a Web browser and a second class method based on said I/O class for execution on an IM coupled to a Web browser; wherein said object is an instance of said I/O class with said I/O class having its own procedures and data variables for performing I/O operations;

checking to determine whether said interpretative based program is being executed on an IM not coupled to a Web browser or on an IM coupled to a Web browser; and if said interpretative based program is executing on an IM not coupled to a Web browser executing said first class method; wherein said first class method perform I/O operations during execution of said interpretative based program; and if said interpretative based program is executing on an IM coupled to a Web browser executing said second class method; wherein either said second class method perform I/O operations during execution of said interpretative based program.

11. The computer readable storage medium to perform I/O operations of claim 10, wherein said interpretative based program is a Java based program.

12. The computer readable storage medium to perform I/O operations of claim 10, wherein said step of executing an interpretative based program includes a Java based program and executing said Java based program.

13. The computer readable storage medium to perform I/O operations of claim 10, wherein said if step of executing on an IM not coupled to a Web browser includes executing a interpretative based program running on an IM not coupled to a Web Browser is a JAVA Application.

14. The computer readable storage medium to perform I/O operations of claim 10, wherein said if step of executing on an IM coupled to a Web browser includes executing a interpretative based program running on an IM not coupled to a Web Browser is a JAVA Applet.

15. The computer readable storage medium to perform I/O operations of claim 10, wherein said step of executing an interpretative based program includes an IM running a Java Virtual Machine.

16. The computer readable storage medium to perform I/O operations of claim 10, further comprising:

defining an I/O class for passing data into said data processing unit and for passing data out of said data processing unit; wherein at least part of said passing of data is through use of a file name.

17. The computer readable storage medium to perform I/O operations of claim 10, further comprising:

defining an I/O class for passing data into said data processing unit and for passing data out of said data processing unit; wherein at least part of said passing of data is through use of a URL (Uniform Resource Locator).

* * * * *